2,893,825

SEPARATION OF PROTACTINIUM FROM CONTAMINANTS

John G. Malm and Sherman Fried, Chicago, Ill., assignors to the United States of America as represented by the United States Atomic Energy Commission No Drawing. Application April 11, 1951
Serial No. 220,532

5 Claims. (Cl. 23—14.5)

The present invention is concerned with the separation of protactinium from contaminants by volatilization methods.

Protactinium, which is the element having atomic number 91, occurs in nature substantially completely as the α-emitting isotope $Pa^{231}$. Protactinium is present in all uranium ores in small concentrations and is recovered from these ores. These ore concentrates usually contain such contaminating elements as uranium, thorium, iron, manganese, hafnium and zirconium.

Since the discovery of neutronic reactors and the methods of producing artificial isotopes which the utilization of these neutronic reactors permits, artificial protactinium isotopes, such as $Pa^{233}$ and artificially produced $Pa^{231}$, have become of increasing importance. These artificial protactinium isotopes are produced by the neutron-irradiation of thorium masses in neutronic reactors. The neutron-irradiation of a thorium-containing mass wherein the thorium isotope has the mass number 232 results in the production of $Th^{233}$, $Pa^{233}$, $U^{233}$ and the radioactive fission products of $U^{233}$, i.e., elements having atomic numbers in the range from 32 to 64. The neutron-irradiation of a thorium mass containing the thorium isotope of atomic mass 230 (ionium) results in the production of $Th^{231}$, $Pa^{231}$, $Pa^{232}$ and $U^{232}$.

An object of the present invention is to provide a method for the recovery of protactinium from elements with which it is usually contaminated in nature.

An additional object of the present invention is to provide a volatility method for the recovery of protactinium from neutron-irradiated $Th^{232}$ masses.

An additional object of the present invention is to provide a volatility method for the recovery of protactinium from neutron-irradiated ionium masses.

Other objects will be apparent from the description which follows.

We have discovered that protactinium compounds contained in neutron-irradiated thorium compounds and in protactinium ore concentrates may be converted to a volatile protactinium chloride by chlorination of the neutron-irradiated thorium mass or the ore concentrate with suitable chlorinating agents and that the volatile protactinium chloride composition may be separated from the mass and the protactinium contaminants which it contains by selective volatilization and condensation methods.

It has been found that suitable chlorinating agents include carbon tetrachloride, phosphorus pentachloride, aluminum trichloride and chlorine and mixtures of these reagents. The process of chlorination and volatilization may be carried out as a batch process or the process may alternatively be carried out by means of a flow method. The process of the present invention is applicable to the recovery of protactinium from a neutron-irradiated thorium mass where the thorium is in the metallic state or is a thorium compound such as a halide, an oxide, hydroxide or other oxygen-containing compound such as thorium oxycarbonate. Particularly satisfactory results have been obtained where the process of the present invention has been applied to the recovery of protactinium from neutron-irradiated thorium chloride. The time of the chlorination reaction will depend somewhat upon the chlorinating agent used, the substance to which it is applied, and the physical condition of that substance. In general, however, satisfactory results may be obtained by carrying out the reaction between one and thirty hours. It is preferable, of course, to have the material to be chlorinated in as finely divided a state as possible. It is preferred to carry out the chlorination at a temperature of between about 100° and 600° C. Further specific details of the present process will be readily apparent from the discussion of the various embodiments of the present invention which follow.

In one embodiment of the present invention, aluminum trichloride or a mixture of aluminum trichloride and chlorine gas or aluminum and an excess of chlorine gas is employed as the chlorinating agent. In the application of this embodiment to the recovery of protactinium from a neutron-irradiated thorium mass, the thorium may be in the metallic state or in the form of one of the thorium compounds enumerated above. The neutron-irradiated thorium compound, preferably in a finely divided state, is reacted with the aluminum chloride chlorinating agent at a temperature of greater than about 100° C. and preferably between about 200° and 400° C. Following the chlorination step, the protactinium chloride is distilled from the mixture and selectively condensed. The protactinium chloride prepared by the usual methods is not volatile below about 300° C. It has been found, however, that when protactinium chloride is prepared by chlorination of neutron-irradiated thorium or protactinium ore concentrates with aluminum chloride as disclosed in the present application, the protactinium chloride is volatile at approximately the same temperature as the aluminum chloride, i.e., from about 75° to 150° C., and the protactinium chloride may be distilled from the chlorinated mass together with aluminum chloride at a temperature within this range and preferably at about 100° C. Distillation from the mass at this temperature results in practically complete separation of the protactinium from all contaminants normally present in compositions of this type. Such fission products as bromine, krypton, iodine and xenon ordinarily will volatilize at a lower temperature and do not condense with the aluminum chloride-protactinium chloride. Thorium chloride, uranium tetrachloride and manganese chloride are not volatile below about 600° C. and such common contaminants as $FeCl_3$, $ZrCl_4$, $CbOCl_3$ and $CbCl_5$ are nonvolatile at less than about 250° C. The aluminum chloride is not an oxidizing agent so that any uranium present will normally be in the form of uranium tetrachloride which is nonvolatile at the temperatures at which the aluminum chloride-protactinium chloride mixture is volatilized.

Several methods may be employed to separate the aluminum chloride from the protactinium chloride following condensation of the mixed vapor. The aluminum chloride-protactinium chloride deposit may be treated with an alkali hydroxide which will cause the aluminum chloride to dissolve and remain in solution and the protactinium chloride to be converted to the insoluble protactinium hydroxide. It has also been discovered that the volatile protactinium chloride produced by chlorination with aluminum chloride may be converted to a relatively nonvolatile chloride by further chlorination in the presence of a reducing metal, such as aluminum, iron, zinc, copper or nickel, or a reducing gas, such as hydrogen. Following the conversion of the volatile protactinium chloride to the nonvolatile form, the $AlCl_3$ may be distilled away from the protactinium chloride.

In the recovery of $Pa^{233}$ from neutron-irradiated $Th^{232}$, it is often desirable to recover the protactinium and uranium together. It has been found that the chlorination of the neutron-irradiated mass in an oxidizing atmosphere, for example a mixture of aluminum chloride and chlorine gas, will result in the production of an increased amount of a uranium chloride volatile in the same temperature range as the protactinium chloride so that a mixture of volatile protactinium chloride and a volatile uranium chloride is obtained.

The process of this embodiment may be illustrated by the following examples.

EXAMPLE I

Samples of $ThO_2$, $ThCl_4$ and $ThF_4$ were irradiated in a neutronic reactor for sufficient time to form appreciable quantities of $Pa^{233}$, uranium and fission products. Each sample was then reacted in a closed reaction chamber with aluminum chloride at the temperatures and for the times shown in Table I. After reaction, the protactinium chloride was distilled at the volatilization temperature of $AlCl_3$, i.e., about 100° C., and condensed in a cool portion of the reaction chamber together with the unreacted $AlCl_3$. The percentages of $Pa^{233}$ distilled in each instance is shown in Table I. The percentage is taken with reference to the amount of protactinium present in the neutron-irradiated thorium sample before chlorination.

Table I

| Th Compound | Temp., °C. | Time, hrs. | Pa Distilled, percent |
| --- | --- | --- | --- |
| $ThO_2$ | 330 | 20 | 32 |
| $ThO_2$ | 375 | 28 | 73 |
| $ThCl_4$ | 170 | 16 | 28 |
| $ThCl_4$ | 390 | 16 | >90 |
| $ThF_4$ | 220 | 16 | 25 |
| $ThF_4$ | 350 | 16 | 45 |

The protactinium recovered was substantially free of thorium, uranium and all fission products.

Similar experiments were carried out with neutron-irradiated ionium oxide wherein the chlorinating agent was aluminum chloride or aluminum chloride mixed with chlorine gas. The results obtained in these experiments are shown in Table II.

Table II

| Conditions Reaction Temp. | $Pa^{231}$ Distilled, percent | $U^{232}$ Distilled, percent |
| --- | --- | --- |
| $AlCl_3$, 440° C | 31 | 1.2 |
| $AlCl_3$, 410° C | 53 | 12 |
| $AlCl_3$, 0.5 atm. $Cl_2$, 460° C | 85 | 30 |
| $AlCl_3$, 0.5 atm. $Cl_2$, 410° C | 89 | 30 |
| $AlCl_3$, 0.5 atm. $Cl_2$, 330° C | 73 | 28 |
| $AlCl_3$, 0.5 atm. $Cl_2$, 560° C | 80 | 37 |
| $AlCl_3$, 6 atm. $Cl_2$, 530° C | | 65 |

In an additional embodiment of the present invention the chlorinating agent employed is carbon tetrachloride. Where carbon tetrachloride is employed as the chlorinating agent, the flow method of chlorination is particularly suitable. By this process carbon tetrachloride or a mixture of carbon tetrachloride and a gas inert under the circumstances such as purified nitrogen, argon or helium is passed over a protactinium-containing compound at an elevated temperature preferably in a tube reactor and the volatile chlorides thus formed are condensed in a cooler portion of the tube. The chlorination is usually carried out at a temperature of 400° to 600° C. and it is often desirable to redistill the first products of chlorination at a lower temperature. The protactinium chloride obtained by the chlorination of neutron-irradiated thorium with carbon tetrachloride is volatile at 400° C. but not at 250° C. Thus, after chlorination is carried out in the range of 400° to 600° C. the chlorides volatile at 400° C. are distilled from the chlorinated mass and condensed. The protactinium chloride present in the neutron-irradiated thorium mass can be substantially completely separated from thorium and manganese which are normally non-volatile at 600° C. under these conditions. The deposit of chlorides volatile at 400° C. is then redistilled at approximately 250° C. and the $FeCl_3$, $ZrCl_4$, $CbOCl_3$ and $CbCl_5$ which are volatile at this temperature are thus separated from the protactinium chloride which is nonvolatile at this temperature.

The separation of protactinium from neutron-irradiated thoria may be further illustrated by Table III in which the neutron-irradiated thoria was chlorinated at a temperature of 600° C., the volatile chlorides then distilled from the chlorinated mass at 400° C. and condensed, and a redistillation of the first reaction products was then carried out at 400° C. to separate the protactinium from other contaminants distilled with it. Except where indicated, the thoria samples employed were neutron-irradiated $Th^{232}$. The first column shows the amount of protactinium recovered after the redistillation. The second column shows the amount of thoria which was converted to the chloride form by the chlorination step.

Table III

| Pa Distilled, percent | $ThO_2$ Chlorinated, percent |
| --- | --- |
| 72.4 | 73 |
| 98 | 99 |
| 75.8 | 62 |
| 97 | 100 |
| 81 | 90 |
| [1] 74 | 43.4 |

[1] Irradiated ionium.

An additional chlorinating agent which may be used is phosphorus pentachloride. Although this chlorinating agent may be used in the flow method, it is most advantageously employed in a closed reactor. An example illustrating this embodiment of the invention follows.

EXAMPLE II

An irradiated thoria sample was mixed with excess $PCl_5$ in a quartz reactor tube. The tube was then evacuated and sealed. The entire tube was then heated to a temperature between 200° and 400° C. for a period of one hour. The tube was cooled and the portion containing the reaction mixture was heated to about 250° C. whereby the excess $PCl_5$ along with the reaction product $POCl_3$ was distilled and condensed in a cool portion of the tube. The reaction mixture was then heated to a temperature between 400° and 500° C. whereby the protactinium was distilled from the mixture and condensed in a cooled zone which was distinct from the $PCl_5$—$POCl_3$ condensation zone. The tube was then cut and it was found that 100% of the protactinium was recovered from the irradiated thoria by this method.

Although the examples have described experiments that were carried out on a small scale, it is to be understood that the process of the present invention is suitably carried out on a large scale and that the necessary equipment would be apparent to those skilled in the art. The chlorinating agents used in the examples describing batch operations are equally applicable to flow chlorination methods. Numerous other modifications of the preferred embodiments described above may be made without departing from the spirit and scope of the invention. Thus, this invention is not to be limited to the examples but it is to be limited only by the appended claims.

What is claimed is:

1. A method for recovering protactinium values from a thorium composition containing protactinium values, which comprises chlorinating said composition with an aluminum chloride chlorinating agent at a temperature between 100° and 600° C., and then distilling the volatile protactinium chloride thus formed from the chlorinated composition at a temperature in the range of 75° to 150° C.

2. The process of claim 1 wherein the thorium composition is a thorium halide.

3. A method for recovering protactinium values from a thorium composition containing protactinium values, which comprises reacting said composition with aluminum chloride at a temperature between approximately 200° and 400° C., and then distilling the volatile protactinium chloride thus formed at a temperature of approximately 100° C.

4. A method for recovering protactinium values from a thorium composition containing protactinium values, which comprises reacting said composition with aluminum chloride at a temperature between 200° and 400° C., then volatilizing the protactinium chloride and aluminum chloride from the chlorinated composition at approximately 100° C., condensing the protactinium chloride and aluminum chloride, and separating the protactinium chloride from the aluminum chloride by treating the condensed mixture of protactinium chloride and aluminum chloride with an alkali hydroxide whereby the aluminum chloride dissolves.

5. The process of claim 4 wherein the protactinium chloride is separated from the aluminum chloride by redistilling the mixture in the presence of a reducing agent.

References Cited in the file of this patent

UNITED STATES PATENTS 1,434,485    D'Adrian _____ Nov. 7, 1922

OTHER REFERENCES

Friend: "Textbook of Inorganic Chemistry," vol. VII, pt. III, page 294 (1926), Charles Griffin & Co., Ltd., London.